(12) United States Patent
Hartgrove et al.

(10) Patent No.: US 7,638,446 B2
(45) Date of Patent: *Dec. 29, 2009

(54) FLAME-RETARDANT CELLULOSIC NONWOVEN FABRIC

(75) Inventors: Herbert Hartgrove, Angier, NC (US); Gregory Rabon, Clayton, NC (US); Russell Tindall, Clemmons, NC (US)

(73) Assignee: Polymer Group, Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 11/053,138

(22) Filed: Feb. 8, 2005

(65) Prior Publication Data

US 2005/0215158 A1    Sep. 29, 2005

Related U.S. Application Data

(60) Provisional application No. 60/542,964, filed on Feb. 9, 2004.

(51) Int. Cl.
*D04H 1/46* (2006.01)
*B68G 11/02* (2006.01)

(52) U.S. Cl. .................. 442/408; 442/327; 442/414; 442/415; 442/416; 428/920; 428/921

(58) Field of Classification Search ............... 442/408, 442/414, 416, 327, 381, 387, 394
See application file for complete search history.

(56) References Cited

U.S. PATENT DOCUMENTS

| | | | | |
|---|---|---|---|---|
| 3,180,775 A | * | 4/1965 | Sexsmith | 156/85 |
| 3,485,706 A | | 12/1969 | Evans | |
| 3,494,821 A | * | 2/1970 | Evans | 442/352 |
| 3,752,733 A | * | 8/1973 | Graham et al. | 524/13 |
| 4,041,203 A | | 8/1977 | Brock et al. | |
| 5,098,764 A | | 3/1992 | Bassett et al. | |
| 5,236,769 A | | 8/1993 | Paire | |
| 5,609,950 A | * | 3/1997 | Kampl et al. | 428/219 |
| 5,678,379 A | | 10/1997 | Quattrociocchi | |
| 5,766,746 A | * | 6/1998 | Kampl et al. | 428/219 |
| 6,114,017 A | | 9/2000 | Fabbricante et al. | |

(Continued)

OTHER PUBLICATIONS

Woodings, Calvin. "Regenerated Cellulose Fibers", 2001, Woodhead Publishing, pp. 62-63.*

(Continued)

*Primary Examiner*—Jennifer A Chriss
(74) *Attorney, Agent, or Firm*—Kilyk & Bowersox, PLLC; Valerie Calloway

(57) ABSTRACT

The present invention is directed to a hydroentangled flame retardant nonwoven fabric, and more specifically, to a cellulosic flame retardant fabric comprising a self extinguishing fiber so as to minimize the total percentage of fabric weight lost upon burning in accordance with technical bulletin 604. Use of natural fiber fabrics in bedding components is desirable due to the softness and durability associated with the fabrics; however, natural fiber, such as cellulose, is highly flammable and therefore lacks the ability to provide the proper flammability protection often sought out in bedding components. In accordance with the present invention, a small amount of self-extinguishing fiber, such as a modacrylic fiber, was blended with the natural fiber and hydroentangled to form a nonwoven composite fabric that is soft, flame retardant, and suitable for bedding articles.

4 Claims, 3 Drawing Sheets

U.S. PATENT DOCUMENTS

| | | | |
|---|---|---|---|
| 6,153,544 | A | 11/2000 | Radwanski et al. |
| 6,191,211 | B1 | 2/2001 | Mussell et al. |
| 6,491,727 | B1 * | 8/2002 | Rearick et al. ............... 8/116.1 |
| 6,489,256 | B1 | 12/2002 | Kent et al. |
| 6,596,658 | B1 * | 7/2003 | Putnam et al. ............. 442/384 |
| 6,660,503 | B2 | 12/2003 | Kierulff |
| 6,823,548 | B2 * | 11/2004 | Murphy et al. ................ 5/698 |
| 7,125,460 | B2 * | 10/2006 | Ogle et al. ................ 156/62.2 |
| 2002/0002764 | A1 | 1/2002 | Putnam et al. |
| 2002/0004348 | A1 | 1/2002 | Kelly et al. |
| 2004/0121114 | A1 * | 6/2004 | Piana et al. .................. 428/85 |
| 2004/0132368 | A1 | 7/2004 | Price et al. |
| 2004/0198125 | A1 * | 10/2004 | Mater et al. ................ 442/394 |
| 2004/0242107 | A1 * | 12/2004 | Collins ....................... 442/403 |
| 2005/0118919 | A1 | 6/2005 | Link et al. |
| 2005/0170732 | A1 * | 8/2005 | Knoff ........................ 442/381 |

OTHER PUBLICATIONS

Lenzing AG, "FR®-Fiberstory—The Heat Protection Fiber", 8 pages, undated, a printout of: http://www.lenzing.com/fibers/en/textiles/print/4166.jsp, Jun. 27, 2007.

Lenzing AG, "TENCEL®", 2 pages, undated, a printout of: http://www.lenzing.com/fibers/en/textiles/print/303.jsp, Jun. 27, 2007.

Lotus Organics, "Lyocell/Tencel: Facts behind the Fiber", 5 pages, 2005 (no month), a printout of: http://www. lotusorganics.com/articles/Iyocell.aspx, Jun. 27, 2007.

U.S. Appl. No. 10/794,315, filed Mar. 5, 2004, Herbert Hartgrove et al., current status: response filed Jul. 9, 2007 to non-final office action mailed Mar. 23, 2007, published as US2005/0197028 A1.

U.S. Appl. No. 10/810,386, filed Mar. 26, 2005, Herbert Hartgrove et al., current status: RCE filed Aug. 1, 2007, published as US2004/0248494 A1.

First Office Action (English translation), counterpart Chinese appln. No. 200580012206.5, dated Dec. 19, 2008, 4 pages.

* cited by examiner

FLAME-RETARDANT CELLULOSIC NONWOVEN FABRIC

CROSS-REFERENCE TO RELATED APPLICATION

This application claims the priority of Provisional Application No. 60/542,964, which was filed on Feb. 9, 2004, and the disclosure of which is incorporated herein by reference.

TECHNICAL FIELD

The present invention generally relates a hydroentangled flame retardant nonwoven fabric, and more specifically, to a cellulosic flame retardant fabric comprising a self extinguishing fiber so as to minimize the total percentage of fabric weight lost upon burning in accordance with technical bulletin 604.

BACKGROUND OF THE INVENTION

More than thirty years ago, flammability standards were instituted by the Consumer Product Safety Commission under 16 C.F.R. § 1632. These standards addressed the flammability requirements of mattresses to resist ignition upon exposure to smoldering cigarettes. However, the Code of Federal Regulations failed to address the need for mattresses to resist ignition upon exposure to small open flames, such as produced by matches, lighters, and candles.

Technological advances have proven to provide mattresses, as well as bedding constituents, with significantly better flammability protection. In light of these advancements, California Legislature has mandated that the Consumer Product Safety Commission establish a revised set of standards that will ensure mattresses and bedding pass an open flame ignition test. Known as Assembly Bill 603 (AB 603), California Legislature has further mandated that the revised set of standards go into affect Jan. 1, 2004.

Flame retardant staple fiber is known in the art. Further, flame retardant fiber has been utilized in the fabrication of nonwoven fabrics for bedding applications. Nonwoven fabrics are suitable for use in a wide variety of applications where the efficiency with which the fabrics can be manufactured provides a significant economic advantage for these fabrics versus traditional textiles. However, nonwoven fabrics have commonly been disadvantaged when fabric properties are compared, particularly in terms of surface abrasion, pilling and durability in multiple-use applications. Hydroentangled fabrics have been developed with improved properties which are a result of the entanglement of the fibers or filaments in the fabric providing improved fabric integrity. Subsequent to entanglement, fabric durability can be further enhanced by the application of binder compositions and/or by thermal stabilization of the entangled fibrous matrix.

U.S. Pat. No. 3,485,706, to Evans, hereby incorporated by reference, discloses processes for effecting hydroentanglement of nonwoven fabrics. More recently, hydroentanglement techniques have been developed which impart images or patterns to the entangled fabric by effecting hydroentanglement on three-dimensional image transfer devices. Such three-dimensional image transfer devices are disclosed in U.S. Pat. No. 5,098,764, hereby incorporated by reference, with the use of such image transfer devices being desirable for providing a fabric with enhanced physical properties as well as an aesthetically pleasing appearance.

Heretofore, nonwoven fabrics have been advantageously employed for manufacture of flame retardant fabrics, as described in U.S. Pat. No. 6,489,256, to Kent, et al., which is hereby incorporated by reference. Typically, nonwoven fabrics employed for this type of application have been entangled and integrated by needle-punching, sometimes referred to as needle-felting, which entails insertion and withdrawal of barbed needles through a fibrous web structure. While this type of processing acts to integrate the fibrous structure and lend integrity thereto, the barbed needles inevitably shear large numbers of the constituent fibers, and undesirably create perforations in the fibrous structure. Needle-punching can also be detrimental to the strength of the resultant fabric, requiring that a fabric have a relatively high basis weight in order to exhibit sufficient strength.

A need exists for a more cost effective flame retardant nonwoven fabric that is cost effective, soft, yet durable and suitable for various end-use applications including, but not limited to bedding constituents, such as mattress components, mattress pads, mattress ticking, comforters, bedspreads, quilts, coverlets, duvets, pillow covers, as well as other home uses, protective apparel applications, upholstery, and industrial end-use applications.

SUMMARY OF THE INVENTION

The present invention is directed to a hydroentangled flame retardant nonwoven fabric, and more specifically, to a cellulosic flame retardant fabric comprising a self extinguishing fiber so as to minimize the total percentage of fabric weight lost upon burning in accordance with technical bulletin 604.

Use of natural fiber fabrics in bedding components is desirable due to the softness and durability associated with the fabrics; however, natural fiber, such as cellulose, is highly flammable and therefore lacks the ability to provide the proper flammability protection often sought out in bedding components. In accordance with the present invention, a small amount of self-extinguishing fiber, such as a modacrylic fiber, was blended with the natural fiber and hydroentangled to form a nonwoven composite fabric that is soft, flame retardant, suitable for bedding articles, and exhibits a minimal amount of mass lost when tested in compliance with technical bulletin 604, which is a technical standard for measuring open-flame resistance in filled bedding articles.

It has been contemplated that the cellulosic fabric of the present invention may be a single layer or may comprise additional layers, wherein the additional layers may be chosen from nonwovens, wovens, and/or support layers, such as scrims.

Further, the nonwoven fabric may be hydroentangled on a foraminous surface, including, but not limited to a three-dimensional image transfer device, embossed screen, three-dimensionally surfaced belt, or perforated drum, suitably further enhancing the aesthetic quality of the fabric for a particular end-use application.

Other features and advantages of the present invention will become readily apparent from the following detailed description, the accompanying drawings, and the appended claims.

DETAILED DESCRIPTION

Figure 1:
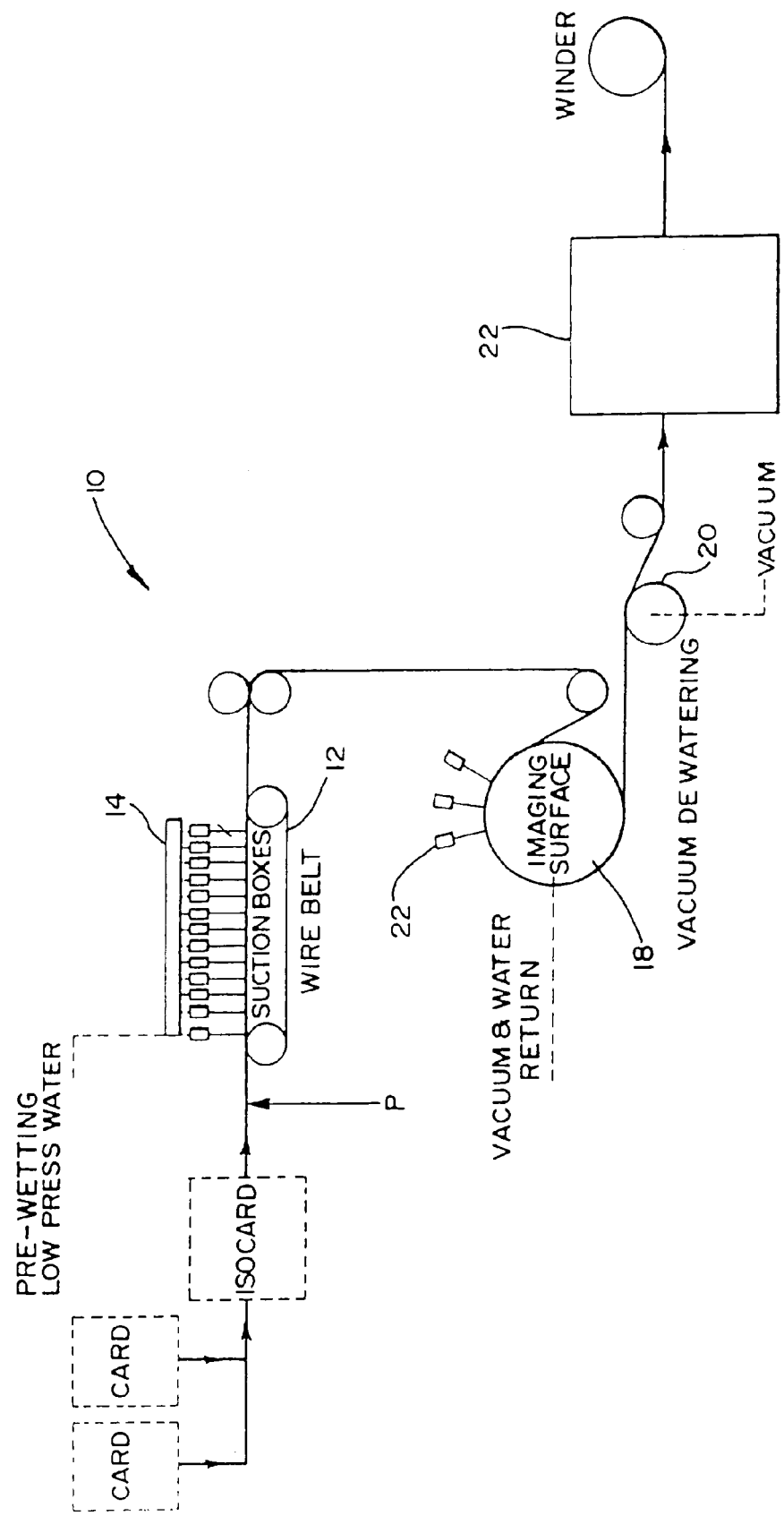
FIG. 1 is a diagrammatic view of apparatus utilized in accordance with the present invention so as to manufacture the flame retardant nonwoven fabric.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

The flame retardant nonwoven fabric of the present invention is cost effective, soft, yet durable and suitable for various bedding articles including, but not limited to a mattress component, mattress covers, comforters, bedspreads, quilts, coverlets, duvets, pillows, pillow covers, in addition to other home uses, protective apparel applications, and industrial end-use applications.

U.S. Pat. No. 3,485,706, to Evans, hereby incorporated by reference, discloses processes for effecting hydroentanglement of nonwoven fabrics. With reference to FIG. 1, therein is illustrated an apparatus for practicing the present method for forming a flame retardant cellulosic nonwoven fabric. The cellulosic and modacrylic fibrous components may be carded and optionally cross-lapped to form a precursor web, designated P, which is consolidated by hydraulically energy to form a nonwoven fabric.

Optionally, the precursor web is further entangled on a foraminous surface, including, but not limited to a three-dimensional image transfer device, embossed screen, three-dimensionally surfaced belt, or perforated drum, suitably further enhancing the aesthetic quality of the fabric for a particular end-use application.

It is in the purview of the present invention, that additional flame retardant fibers be incorporated into the precursor web, these fibers include, but are not limited to melamine fibers, phenolic fibers, such as Kynol™ fiber from American Kynol, Inc., pre-oxidized polyacrylonitrile fibers, such as Panox® fiber, a registered trademark to R.K. Textiles Composite Fibres Limited.

FIG. 1 further illustrates a hydroentangling apparatus, whereby the apparatus includes a foraminous forming surface in the form of belt 12 upon which the precursor web P is positioned for entangling or pre-entangling by manifold 14.

The entangling apparatus of FIG. 1 may optionally include an imaging and patterning drum 18 comprising a three-dimensional image transfer device for effecting imaging and patterning of the lightly entangled precursor web. The image transfer device includes a moveable imaging surface which moves relative to a plurality of entangling manifolds 22 which act in cooperation with three-dimensional elements defined by the imaging surface of the image transfer device to effect imaging and patterning of the fabric being formed.

It is also contemplated that one or more supplemental layers be added to the fabric of the present invention, wherein such layers may include a spunbond fabric. In general, the formation of continuous filament precursor webs involves the practice of the "spunbond" process. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web. Further, the addition of a continuous filament fabric may include those fabrics formed from filaments having a nano-denier, as taught in U.S. Pat. No. 5,678,379 and No. 6,114,017, both incorporated herein by reference. Further still, the continuous filament fabric may be formed from an intermingling of conventional and nano-denier filaments.

It has been contemplated that the nonwoven fabric of the present invention incorporate a meltblown layer. The meltblown process is a related means to the spunbond process for forming a layer of a nonwoven fabric is the meltblown process. Again, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first layer until the bonded web is wound into a roll. Methods for producing these types of fabrics are described in U.S. Pat. No. 4,041,203. The meltblown process, as well as the cross-sectional profile of the meltblown microfiber, is not a critical limitation to the practice of the present invention.

In accordance with the present invention, the hydroentangled flame retardant fabric may comprise a film layer. The formation of finite thickness films from thermoplastic polymers, suitable as a strong and durable carrier substrate layer, is a well-known practice. Thermoplastic polymer films can be formed by either dispersion of a quantity of molten polymer into a mold having the dimensions of the desired end product, known as a cast film, or by continuously forcing the molten polymer through a die, known as an extruded film. Extruded thermoplastic polymer films can either be formed such that the film is cooled then wound as a completed material, or dispensed directly onto a secondary substrate material to form a composite material having performance of both the substrate and the film layers.

Extruded films can be formed in accordance with the following representative direct extrusion film process. Blending and dosing storage comprising at least one hopper loader for thermoplastic polymer chip and, optionally, one for pelletized additive in thermoplastic carrier resin, feed into variable speed augers. The variable speed augers transfer predetermined amounts of polymer chip and additive pellet into a mixing hopper. The mixing hopper contains a mixing propeller to further the homogeneity of the mixture. Basic volumetric systems such as that described are a minimum requirement for accurately blending the additive into the thermoplastic polymer. The polymer chip and additive pellet blend feeds into a multi-zone extruder. Upon mixing and extrusion from the multi-zone extruder, the polymer compound is conveyed via heated polymer piping through a screen changer, wherein breaker plates having different screen meshes are employed to retain solid or semi-molten polymer chips and other macroscopic debris. The mixed polymer is then fed into a melt pump, and then to a combining block. The combining block allows for multiple film layers to be extruded, the film layers being of either the same composition or fed from different systems as described above. The combining block is connected to an extrusion die, which is positioned in an overhead orientation such that molten film extrusion is deposited at a nip between a nip roll and a cast roll.

In addition, breathable films can be used in conjunction with the disclosed continuous filament laminate. Monolithic films, as taught in U.S. Pat. No. 6,191,211, and microporous films, as taught in U.S. Pat. No. 6,264,864, both patents herein incorporated by reference, represent the mechanisms of forming such breathable films.

Subsequent to fabric formation, the cellulosic fire retardant fabric may be subjected to one or more variety of post-entanglement treatments. Such treatments may include application of a polymeric binder composition(s), mechanical compacting, application or incorporation of performance enhancing additives, electrostatic compositions, and like processes.

In accordance with the present invention, a representative sample comprise 60% staple length Tencel® lyocell fibers, Tencel® is a registered trademark of Courtaulds Fibres (Holdings) Limited, and 40% PBX® modacrylic fibers, PBX® is a registered trademark to Kaneka, with a basis weight of about 2.0 oz/yd². Preferably, the nonwoven fabric comprises a 65/35 Tencel® lyocell/PBX® modacrylic blend, and more preferably a 70/30 Tencel® lyocell/PBX® modacrylic blend, in order to optimize cost effectiveness, yet still provide the desired performance. Subsequently, the fiber blend was consolidated into a composite flame retardant nonwoven fabric by way of hydroentanglement and tested in accordance with Technical Bulletin 604 to determine the weight of fabric lost when exposed to open-flames.

The burn test was conducted utilizing a "sewn in" construction and a "bag in bag" construction. A "sewn in" construction is a layered construction, wherein the two layers of the cellulosic fire retardant fabric is position between two outer shell layers. The layered construct is sewn along three of the four sides, fiber-fill is loaded within the inner most cellulosic fire retardant fabric layers, and the forth side subsequently sewn. A "bag in bag" construction utilizes a bag made of the cellulosic fire retardant fabric that is loaded with fiber-fill and sewn closed. The cellulosic fire retardant fabric bag is then inserted into a shell bag, wherein the shell bag that encapsulates the cellulosic fire retardant fabric is sewn closed.

Figure 2:
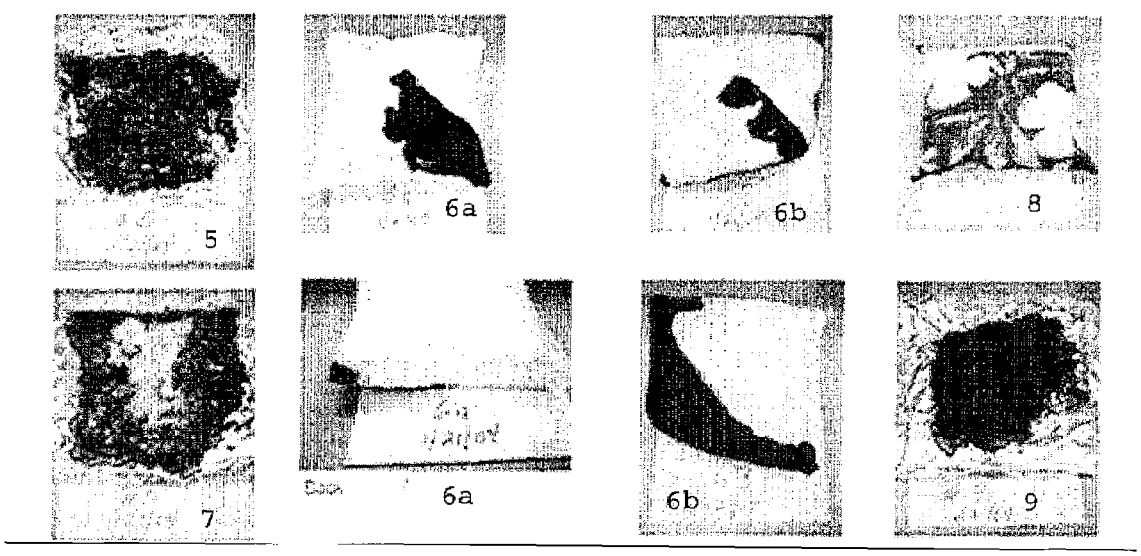
FIG. 2 shows photographs of samples of fabric embodying the present invention, and comparative samples.

The fabric of the present invention preferably loses between 0.5%-5% of its basis weight after 360 seconds, and more preferably between 1%-4%, when tested by a "sewn in" construct (see FIG. 2, 6a). The fabric of the present invention preferably loses between 3%-15% of its basis weight after 360 seconds, and more preferably between 6%-12%, when tested by a "bag in bag" construct (see FIG. 2, 6b).

Figure 3:
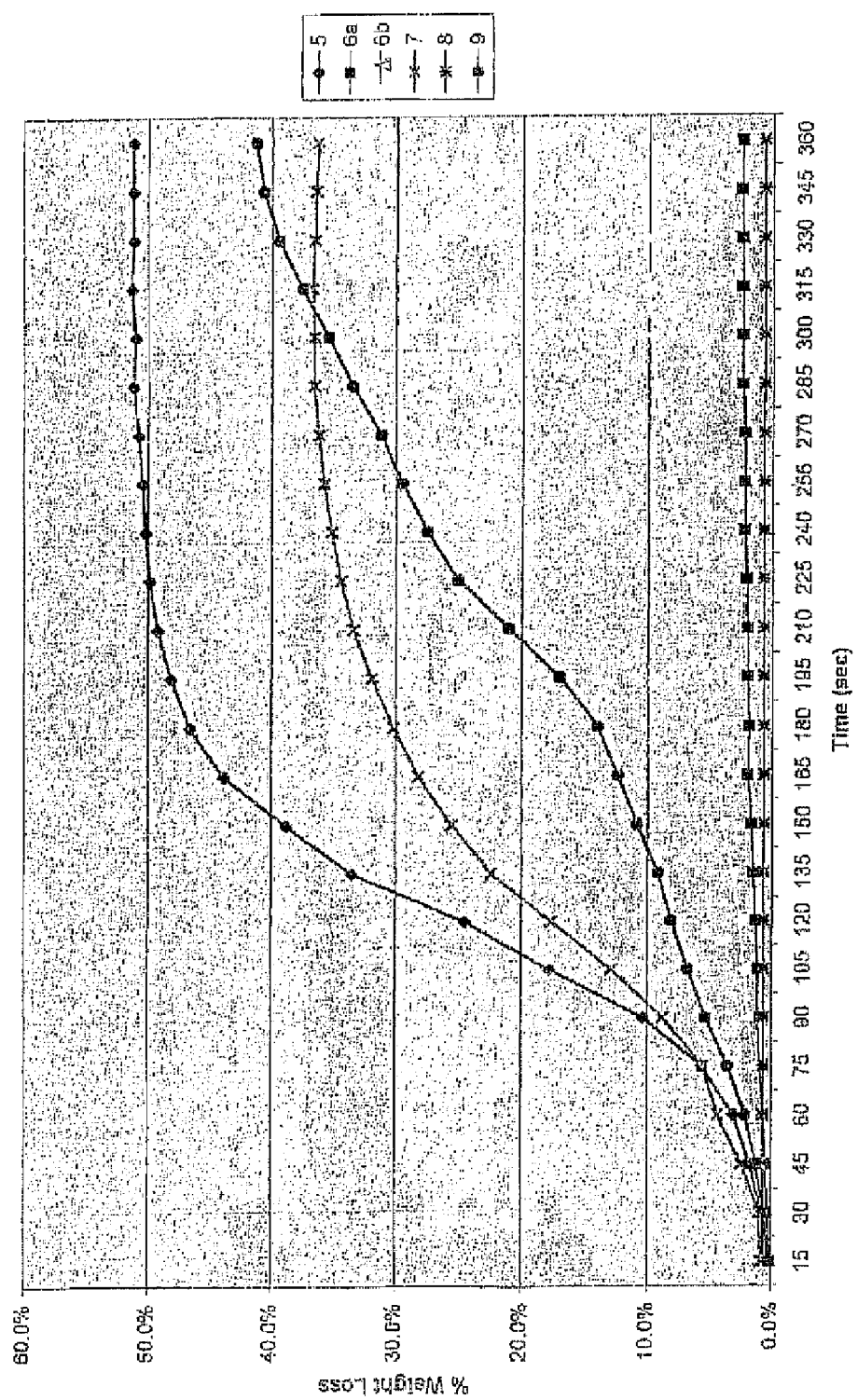
FIG. 3 shows data generated in connection with the samples shown in FIG. 2.

FIG. 3 illustrates the physical test results of the aforementioned fabric, as well as test results for comparative samples illustrated in FIG. 2.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A flame retardant nonwoven fabric consisting essentially of a hydroentangled fiber blend consisting essentially of 60-65% lyocell fiber and 40-35% self-extinguishing modacrylic fiber, wherein said fabric exhibits a basis weight loss of 3-15% after 360 seconds when tested in compliance with Technical Bulletin 604 using a bag in bag construct.

2. A three-dimensionally imaged flame retardant nonwoven fabric consisting essentially of a hydroentangled fiber blend consisting essentially of 60-65% lyocell fiber and 40-35% self-extinguishing modacrylic fiber, wherein said fabric exhibits a basis weight loss of 3-15% after 360 seconds when tested in compliance with Technical Bulletin 604 using a bag in bag construct.

3. A flame retardant nonwoven fabric as in claim 1, wherein said fabric is more than one layer.

4. A flame retardant bedding article consisting essentially of a hydroentangled fiber blend consisting essentially of 60-65% lyocell fiber and 40-35% self-extinguishing modacrylic fiber, wherein said fabric exhibits a basis weight loss of 3-15% after 360 seconds when tested in compliance with Technical Bulletin 604 using a bag in bag construct.

* * * * *